United States Patent [19]
Connor

[11] Patent Number: 5,806,067
[45] Date of Patent: Sep. 8, 1998

[54] METHOD AND APPARATUS FOR DATA PROCESSING WITH CONVERSION OF AMBIGUOUS DATA STRUCTURES

[75] Inventor: William E. Connor, Stony Brook, N.Y.

[73] Assignee: Catch/21 Enterprises, Inc., Hauppauge, N.Y.

[21] Appl. No.: 735,397

[22] Filed: Oct. 21, 1996

[51] Int. Cl.⁶ .................................................... G06F 17/30
[52] U.S. Cl. .............................. 707/100; 707/1; 395/704
[58] Field of Search .............................. 707/1, 101–103, 707/704

[56] References Cited

U.S. PATENT DOCUMENTS

| | | | |
|---|---|---|---|
| 5,307,498 | 4/1994 | Eisen et al. | 395/700 |
| 5,389,924 | 2/1995 | Ogawa | 341/106 |
| 5,454,106 | 9/1995 | Burns et al. | 395/600 |
| 5,630,118 | 5/1997 | Shaunessy | 707/1 |
| 5,644,762 | 7/1997 | Soeder | 707/101 |
| 5,719,826 | 6/1993 | Lips | 368/29 |

OTHER PUBLICATIONS

"Data Logic Generator", Jon Pearkins, Enterprise Systems Journal, vII, n5, p. 7(1), May, 1996.

"Platinum TransCentury Date Simulator", available on the World Wide Web at http://ww.platinum.com/products/year2k,retrieved on Dec. 16, 1997, Dec. 1995.

"The Fifth Millennial Maintenance Conference", Sep. 22, 1995, Baltimore/Washington International Airport; presented by Paul O'Neil of Raytheon Company (Bedford, MA).

Primary Examiner—Thomas G. Black
Assistant Examiner—Hosain T. Alam
Attorney, Agent, or Firm—Fitzpatrick, Cella, Harper & Scinto

[57] ABSTRACT

In data processing of a computer software having ambiguous data such as a data structure with date field having an ambiguous YY two digit year representation based on 00, inputting of one or more ambiguous year representations is detected prior to performing a processing step and a corresponding unambiguous year representation with the same format as the ambiguous year representation is substituted for each detected ambiguous year representation in performing the processing step. One or more unambiguous year representations to be outputted by the processing step is detected and each unambiguous year representation to be outputted is converted to the corresponding ambiguous year representation which is outputted. The substituted unambiguous YY year representation has the same format as the YY ambiguous year representation but uses a base year other than 00 that precedes the earliest date of the ambiguous date fields. In this way, processing errors due lack of century representation are corrected without requiring modification of the logic of the processing steps or of data sources. The date conversion can be automatically performed and can be applied to legacy software of different computer language types.

4 Claims, 15 Drawing Sheets

METHOD AND APPARATUS FOR DATA PROCESSING WITH CONVERSION OF AMBIGUOUS DATA STRUCTURES

FIELD OF THE INVENTION

The invention relates to data processing in systems using ambiguous data fields and more particularly to automatic correction of ambiguous dates in data processing systems.

BACKGROUND OF THE INVENTION

In data processing systems, information is generally formatted in predetermined data structures to facilitate processing and the structured information is stored in data bases as data fields of various types for use in processing. Each data structure includes plural fields which are structured as to type of data (e.g., characters, numbers, dates, etc. and as to number of data bits). Most data structures provide unambiguous representations of information. In early developed processing systems where memory capacity was severely limited, data structures for dates utilized only a two digit representation of year information with a 00 base corresponding to the year 1900. This data structure provided a significant savings in file storage space and in memory usage. Date data structured in the YY form based on 00, however, is ambiguous as to century. Thus, the year 1975 represented in YY form as 75 could be interpreted either as 1975 or 2075 and arithmetic operations using the YY data structure result in errors. For example, programs that compare dates or that calculate durations are certain to produce errors when arithmetic operations are performed on data structures with two digit year elements such as 96 for 1996 and 00 for 2000. As a result, the use of ambiguous two digit year elements in financial, banking and insurance industries must be corrected when data for the year 2000 and beyond is used.

The storage capacity of computing systems has substantially increased with technological advances so that data processing arrangements with unambiguous four digit YYYY year representations are now in use. The early developed systems known as "legacy" systems, however, have such extensive bases of historical data that replacement of the systems is very difficult and expensive. Further, documentation for "legacy" systems may not be available for conversion of ambiguous date structures. As the year 2000 approaches, it has been recognized that the ambiguous two digit year representation will extensively impact the financial, government and industrial communities world wide. Accordingly, there is a large scale effort to provide a solution to the ambiguity created by the two digit YY year representation without requiring replacement of the legacy software. Several approaches have been proposed to enable continued use of legacy systems with ambiguous data structures with dates beyond 1999.

According to one proposal, two-digit years in computer stored or used information are expanded to three of four digits to provide century representation. While the conversion to century representation in the date data structure provides a permanent solution with no further maintenance required, it is complex and very costly, requires extensive system documentation, very extensive data conversion, bridging programs between software applications, and extensive changes to system control programs.

According to another proposal, the coding of two-digit dates is changed to a format that adds a century representation in the same number of bytes. This solution is permanent and does not require extensive changes in control programs but still requires bridging programs to other software applications, to external systems and to historical data. It is also necessary to prepare data conversion programs and procedures and data packing and unpacking logic must be embedded in software applications. The required adjustments could also impact system performance.

The aforementioned proposals all require changing an ambiguous year representation in the date structure inputted for processing to a completely different format so that the processing steps of each legacy program using the date structure must be modified to accommodate a different year representation format. Accordingly, each processing step of a legacy program must be analyzed and rewritten to provide the needed changes for using the modified data structures.

In accordance with yet another proposal, two-digit year data are left unaltered in data stores external to a data processing system. The processing system represents dates internally by a structure with a range of several centuries (e.g., SAS Systems have a date structure covering the years from 1582 AD to 20,000 AD). When encountered in programs, two-digit year data from external sources are expanded to the internal date representation by comparing the year to a reference year other than 00. If the difference between the two-digit year and the reference year is negative, the two-digit year from an external source is converted to the internal data structure corresponding a twenty first century date. Otherwise, the two-digit year is converted to the internal data structure corresponding to a twentieth century date.

As readily seen, the last mentioned proposal generates a hundred year window from the reference date and only decides which century to which the two-digit year belongs for two-digit years within the hundred year window. While the proposal eliminates software bridges, conversion of programs and procedures, reduces the need for program logic changes and eliminates the requirement of change to control programs except for external sorts, it requires embedding application logic to window dates, changes in working storage and to linkage and communication areas, all of which may impact performance. Further, this proposal only applies to data processing software in which an extended century range data structure for dates is already embedded. Most legacy software, however, utilize an internal date structure that includes the ambiguous year representation so that it is necessary to change the format of the internal year representation in order to provide correct computation.

BRIEF SUMMARY OF THE INVENTION

It is an object of the invention to provide an arrangement that modifies ambiguous data structures in all types of data processing software to assure accurate data processing that leaves program logic unaltered and eliminates the need for bridging between software applications, changing control programs and file conversion programs.

The invention is directed to data processing with data structures having ambiguous elements in which each ambiguous element to be inputted to a processing step of data processing system is converted to an unambiguous element for processing and each unambiguous element to be outputted from the processing step is converted into the corresponding ambiguous element.

According to the invention, inputting of one or more ambiguous elements of a predetermined format in a processing step of a data processing system is detected prior to performing the processing step. The processing step is performed by substituting an unambiguous element of the same predetermined format for each inputted ambiguous element that is detected. After performance of the processing step, each unambiguous element to be outputted is converted to a corresponding output ambiguous element.

According to one aspect of the invention, the ambiguous element is a year representation in a two digit form YY having a 00 basis.

According to another aspect of the invention, the detected inputted ambiguous element is converted to a year representation in which the year is in the same two-digit form YY with a basis year YY other than 00 that precedes the earliest year in the ambiguous representation.

According to yet another aspect of the invention, the basis year in the form YY other than 00 corresponds to a leap year.

According to still yet another aspect of the invention, the basis year is a leap year YY divisible by 28.

In an embodiment illustrative of the invention, stored source code for a data processing program and control programs therefore are automatically scanned to form a data dictionary that identifies data structures with ambiguous year representations and processing steps in which ambiguous year representations are inputted and outputted. Calls are automatically inserted into the detected processing steps of a stored program which convert ambiguous year representations to be inputted to and output from the processing steps. In each processing step of the data processing, the inputted ambiguous year representations are detected and converted to corresponding unambiguous year representations of the same predetermined format as the ambiguous year representations by the stored conversion program prior to performing the processing step. After the processing step is performed, the unambiguous year representations to be output from the processing step for storage in a data source are detected and converted to corresponding ambiguous year representations. Advantageously, the correction of processing with ambiguous year representations may be automatically performed for legacy systems of different types without altering system logic or the year representations in data sources for the system.

As an example, selection of a base date of 1956 for the basis year converts the ambiguous two digit year "92" for 1992 to "36". Accordingly, the ambiguity of "92" as 1992 or 2092 is removed since 2092 is beyond 100 years. The two digit year "01" for 2001 is represented as the year "45" for the base year of 1956. The ambiguity between 1901 and 2001 is removed since 1901 precedes the base year. As a result, all two digit represented years for 100 years from the user selected base date are converted into an unambiguous year representation having the same format YY for processing without altering the processing steps of the legacy program.

DETAILED DESCRIPTION OF THE INVENTION

Figure 1:
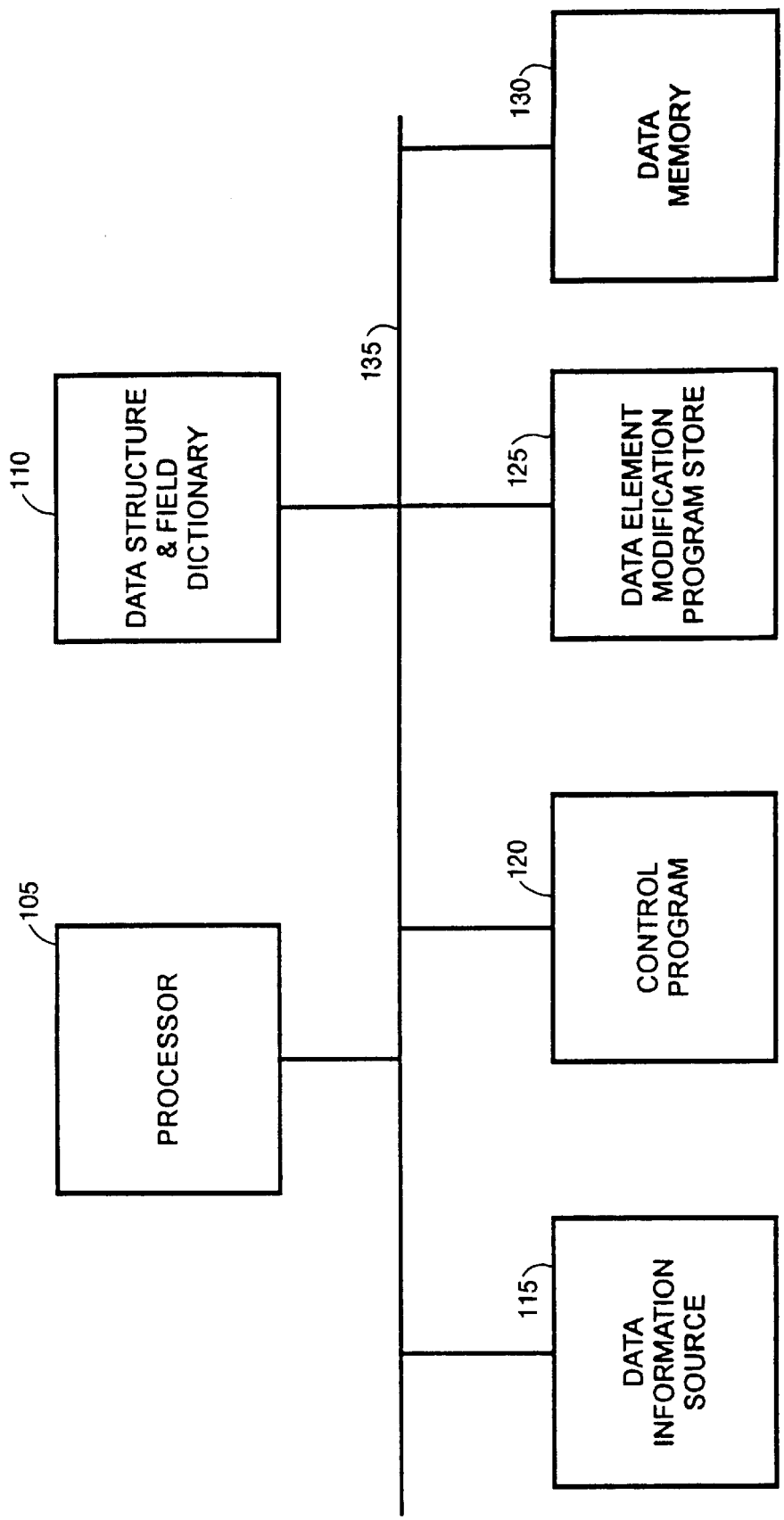
FIG. 1 is a block diagram of a signal processor arrangement illustrative of the invention.
Figure 2:
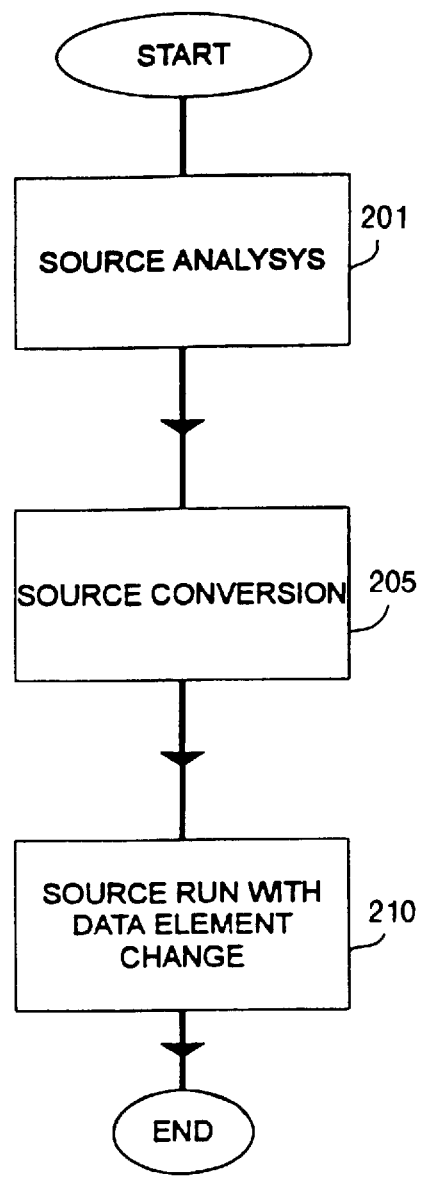
FIG. 2 is a general flow chart illustrating the general operation of the invention.

FIG. 1 depicts a block diagram of a system illustrative of the invention that may be used to process preexisting programs with ambiguous date representations and FIG. 2 is a general flow chart illustrating the operation of the system of FIG. 1. It is to be understood, however, that the operations of FIG. 2 may be performed by a many different types of computer systems such as the IBM mainframe ES9000, 0009x, IBM AS-400 DEC-VAX, Hewlett Packard and other UNIX-based systems. Referring to FIG. 1, a processor 105 processes data according to a preexisting software application (e.g., "legacy" program) which includes references to data structures having ambiguous year representations of the form YY with a 00 basis. A data information source 115 stores information to be processed in the processor 105 and information resulting from the processing. A control source 120 stores one or more control programs to control the processing of the information in the information source 120 in processor 105. A data memory 130 stores data during processing in the processor 105. A data structure dictionary 110 includes tables identifying data structures and fields having ambiguous year representations which are used in the preexisting system and a data element modification store 125 stores a set of programs which effect analysis to identify data structures to be changed during processing, effect conversion of the preexisting program to include transformation of ambiguous year representations in the preexisting program to unambiguous year representations and operate program segments during the processing of the converted program to provide conversion between ambiguous year representations and unambiguous year representations.

Figure 3:
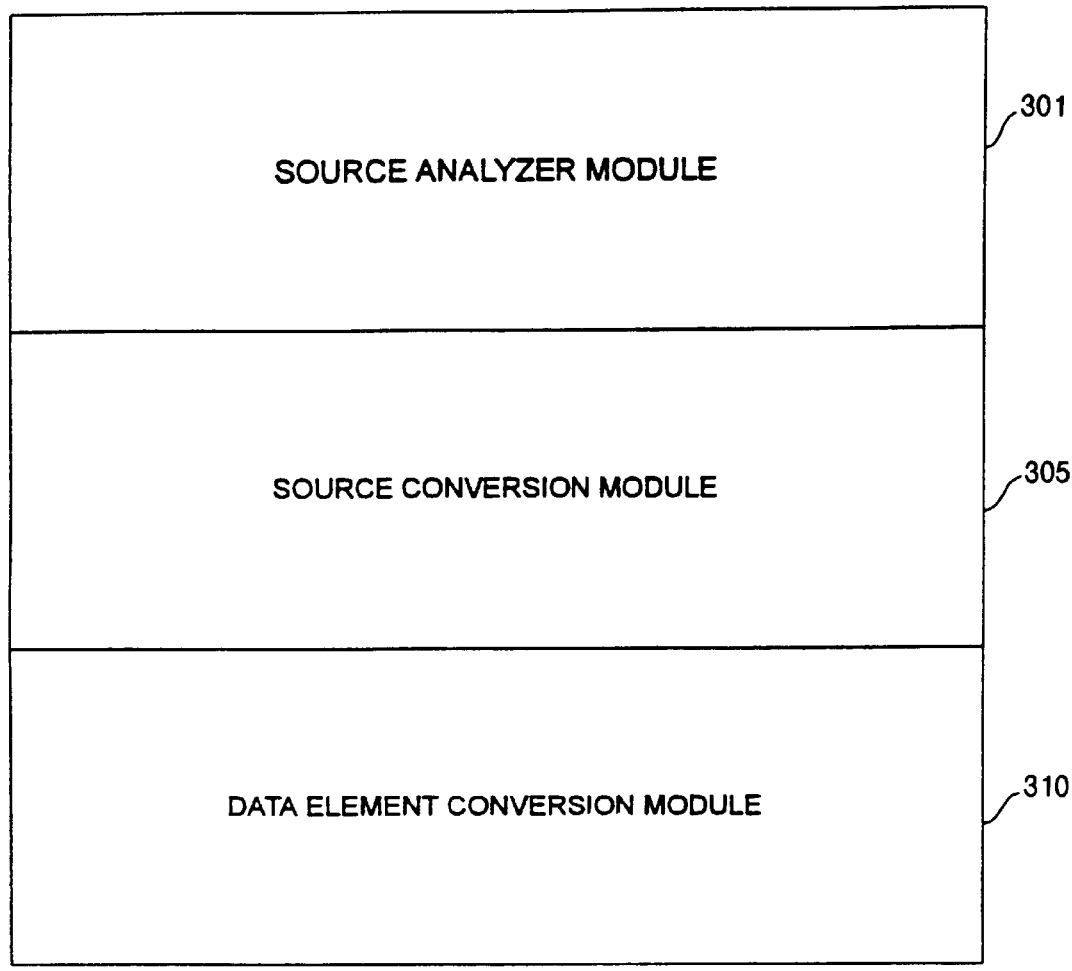
FIG. 3 is a block diagram showing the stored instruction modules used to control the operations of the signal processor of FIG. 1.

The operation of the processing arrangement of FIG. 1 is generally shown in FIG. 2 in which processing is performed under control of the stored instructions in the data structure modification program store 125. In step 201 of FIG. 2, the processor 105 automatically analyzes the source code of the preexisting system to determine the data structures therein and to identify data fields having ambiguous year representations. The operations of step 201 are performed under control of the stored instructions of a source analyzer module 301 of data structure modification program store 125 which is arranged as shown in FIG. 3. The analysis results obtained in step 201 are stored in the data structure and field dictionary 110 of FIG. 1. Appendix 1 is a list of instructions corresponding to the stored instruction codes in source analyzer module 301 for performing the source analysis of the invention.

After the analysis is completed, the original source code of the preexisting program stored in control program store 120 is processed in the processor 105 under control of stored instructions of a source converter module 305 in program store 125 to output a revised source code. In the revised source code, the processing steps of the original source code are augmented to convert ambiguous year representations to unambiguous year representations of the same format. The conversion is perform ed in step 205 of FIG. 2 by inserting year representation conversion calls to year representation instructions of a data element conversion module 310 into each processing step in which inputting or outputting of ambiguous year representations has been identified in the data dictionary store 110. Appendix 2 is a list of instructions corresponding to the stored instruction codes in the source conversion module 305 for performing the source conversion of step 205 of FIG. 2.

The revised source code replaces the original source code of the preexisting program in the control program store 120. Step 210 of FIG. 2 is entered when the processing of the converted preexisting program is performed. In the system processing, the processor 105 operates under control of the revised source code in the control program store 120 with calls to year representation conversion instructions stored in a data element conversion module 310 of the data element modification program store 125 shown in FIG. 3. Appendix 3 is a list of instructions corresponding to the stored instruction codes in the data element conversion module 310 for performing the source conversion of step 210 of FIG. 2.

The flow charts of FIGS. 4–15 show operations of the source analyzer, source converter and conversion modules with respect to source code conversion of a COBOL language application. The COBOL language is described in the publication "VS COBOL II Application Programming Language Reference", IBM Corp. Product Number GC26-4047-07, 8th. Edition, March 1993. It is to be understood, however, that source code conversion according to the invention may be performed for any computer language such as PL-I, FORTRAN, RPG, Assembly, SAS, etc.

The flow charts of FIG. 4–8 illustrate the operation of the source analyzer module 301 of FIG. 3 in which the source code of the preexisting system stored in control program store 120 is analyzed to form expanded work files for each of the member program of the system. The expanded work files integrate the source code of the member program with code of programs referred to by the member program. The records of the expanded work file are then sequentially examined to detect file and working variables that relate to ambiguous year representations and a candidate data structure list is generated. When the end of the work file for a member program is detected, it is reopened to determine the fields and the field formats in the data structure list and to classify the fields as to whether they include ambiguous year representations.

Figure 4:
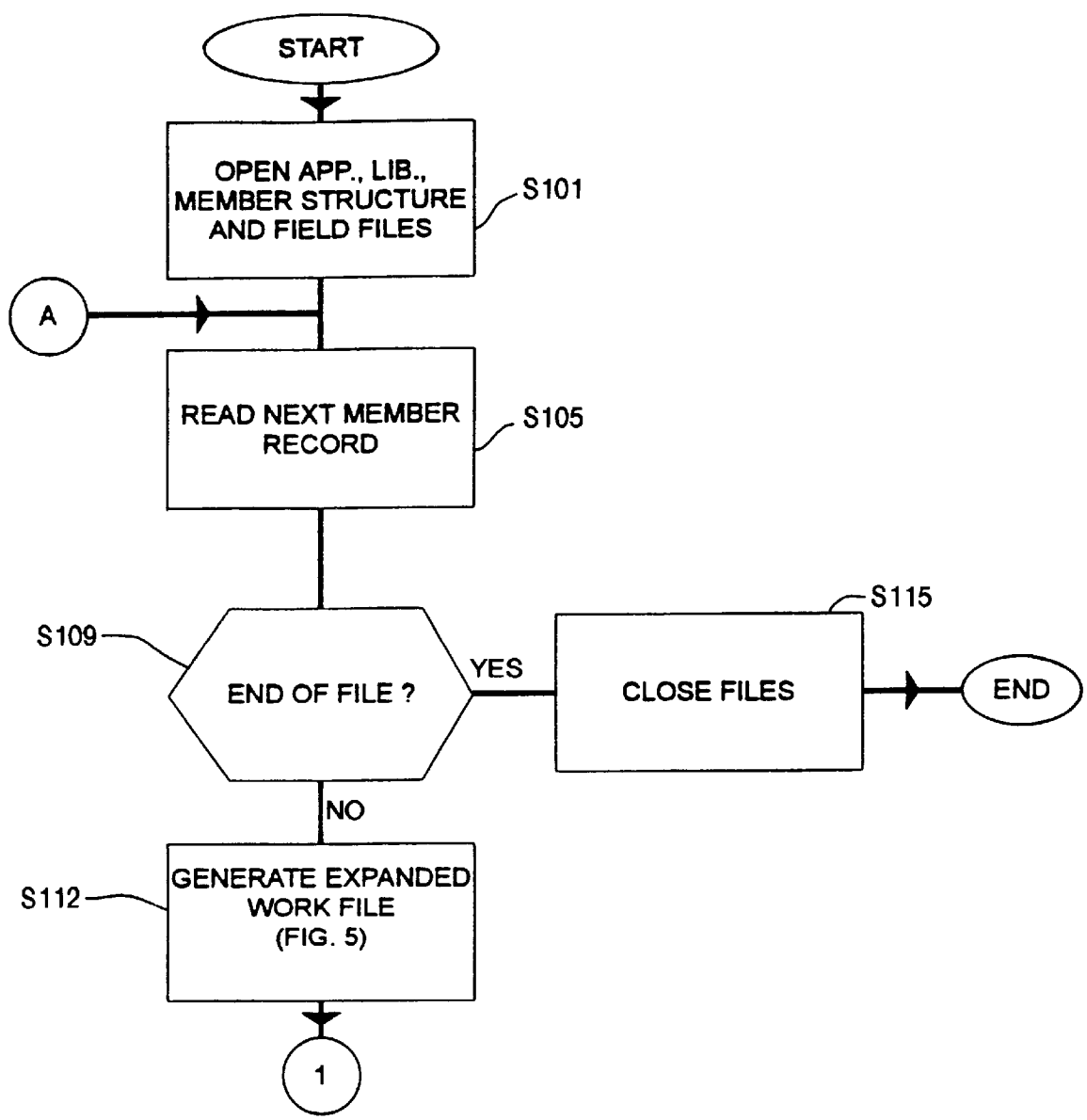
FIGS. 4–8 are flow charts illustrating the detailed operation of the source code analysis module of FIG. 3.

Referring to FIG. 4, the structure, field, library, application and member files of the preexisting program system are opened in step S101. The member file contains records identifying the member programs of the preexisting system. The structure file contains a list of unique data structures in the preexisting system and the field file contains data fields for these data structures. The library file lists libraries of programs used in the preexisting system and copy books in the libraries of the library file. The records from the opened member file are accessed sequentially and the next member record of the opened member file is read in step S105. When an end of file is detected in step S109, the files are closed in step S115 and the structure analysis is completed. Until the end of file is detected in the step S109 and step S112 is entered in which an expanded work file is generated according to the flow chart of FIG. 5.

Figure 5:
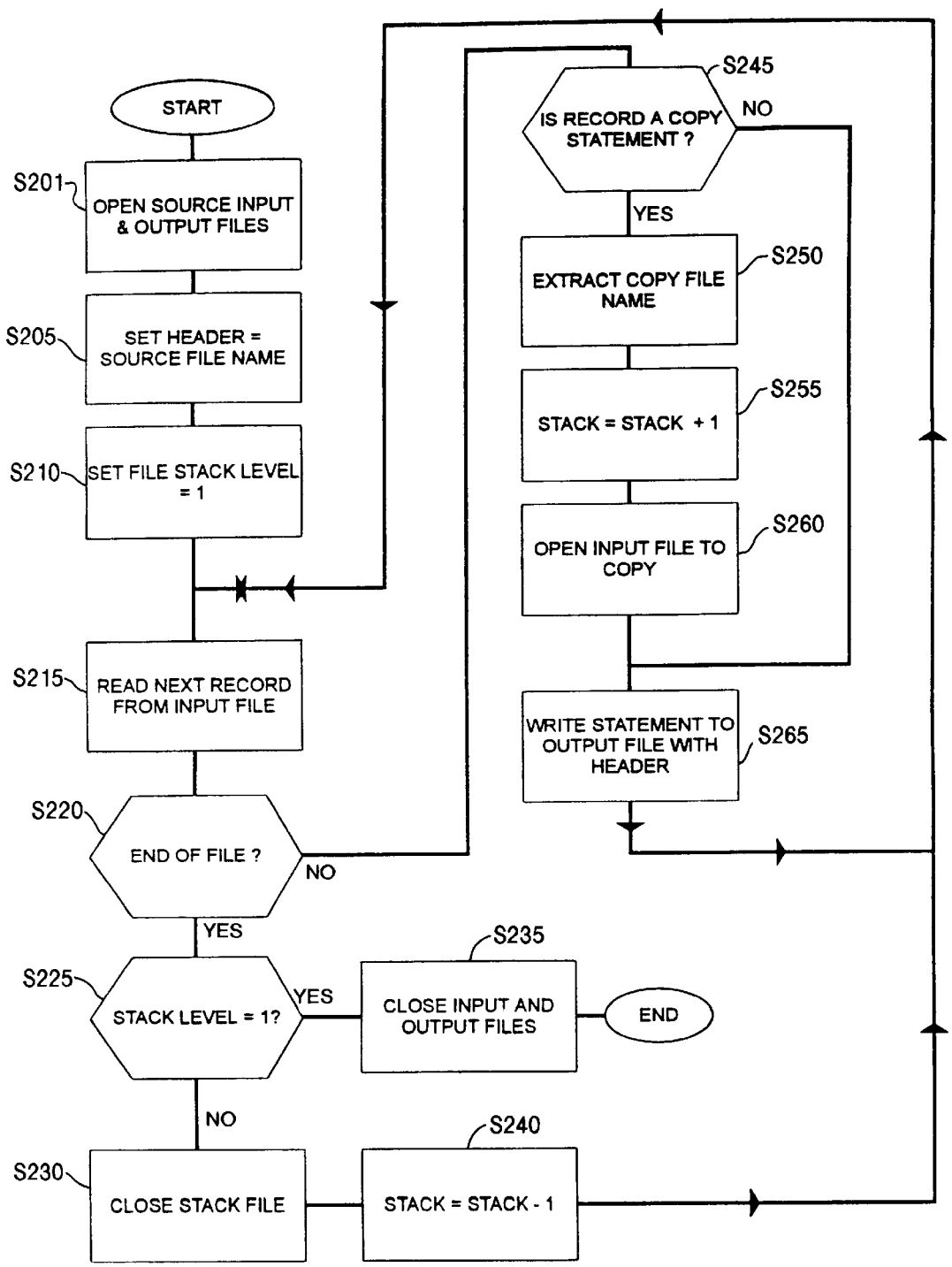

In FIG. 5, a source input file corresponding to the program of the member record and a source output file, corresponding to an expanded version of the source file, are opened (step S201) and a header is set to the source file name (step S205). A file stack level is then set to a level 1 (step S210). The stack identifies the program that is being processed. Initially the member program is identified as stack level 1. If the next record of the input source file read in step S215 is not an end of file (step 220), it is decided in step S245 whether the record is a copy statement that copies a file from another program referenced by the stack level program. When a copy statement is detected in step 245, the copy file name is extracted (step S250) and the stack level is incremented by one (step 255). The input file is then opened for copying in step S260 and the record statement is written to the output file with the header (step 265). When the record is not a copy statement in step S245, the record statement is written to the output file with the header in step 265. Control is then transferred back to step 215 to process the next record of the file identified by the stack level.

If the end of the stack level file is detected in the decision step S220 and the stack file level is not equal to one (decision step S225), the file corresponding to the stack level is closed (S230), the stack is decremented by one in step S240 and step S215 is reentered to read the next file record from the file corresponding to the decremented stack level. When it is determined in decision step S225 that the stack level is equal to one corresponding to the source input file of the member record, the input and output files are closed in step S235. As a result of the operation of the flow chart of FIG. 5, an expanded work file is automatically formed with the integrated source code of the member program and all programs referenced by the member program.

Figure 6:
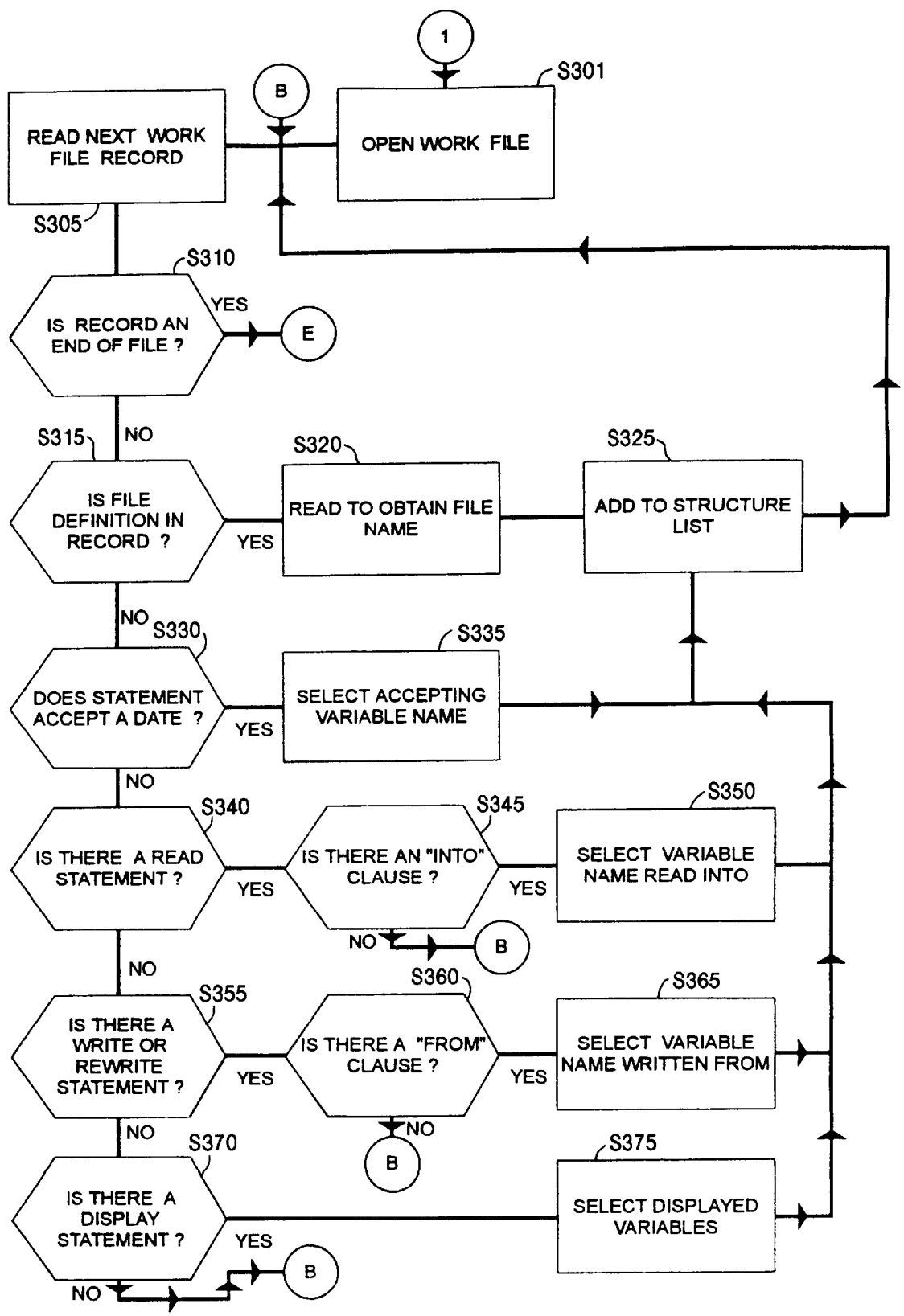

In the flow chart of FIG. 6, a list of candidates for data structures relating to dates is formed. Referring to FIG. 6, the expanded work file generated in step S112 of FIG. 4 is opened (step 301) and the next work file record is read (S305). If the record is not determined to be an end of file in step S310, it is decided in step S315 whether the record includes a file definition. If "yes", the file definition is read (step S320) and stored in a candidate structure list (step S325) which lists data structures that are candidates for year representation modification and the next work file record is read in step S305. If "no" in step S315, decision step 330 is entered. When it is determined that the work file record accepts a date in step 330, the date accepting variable name is selected (step S335) and added to the candidate structure list (step S325).

Upon a "no" decision in step 330, it is decided whether there is a READ statement in the work file record in step S340. If yes and there is an INTO clause in the READ statement (step S345), the variable name READ INTO is selected (step S350) and added to the structure list in step 325. Step S305 is then reentered. Absent an INTO clause in the step S345, the READ is not considered a candidate and step S305 is reentered. When no READ statement is detected in the step S340, whether a WRITE or REWRITE statement is in the record is decided in decision step S355. If YES in step S355 and it is determined that there is a FROM clause in the WRITE statement (step S360), the variable name written from is selected (step S365) and added to the candidate structure list in step S325. Control is then passed to step S305. Responsive to a NO decision in the step S355, it is determined whether there is a DISPLAY statement in the present work file record in decision step S370. If a DISPLAY statement is detected, the displayed variable names are selected (step S375), added to the candidate structure list (step S325) and step S305 is reentered. If there is a NO decision in the step S370, control is passed to step S305 to read the next work file record.

Figure 7:
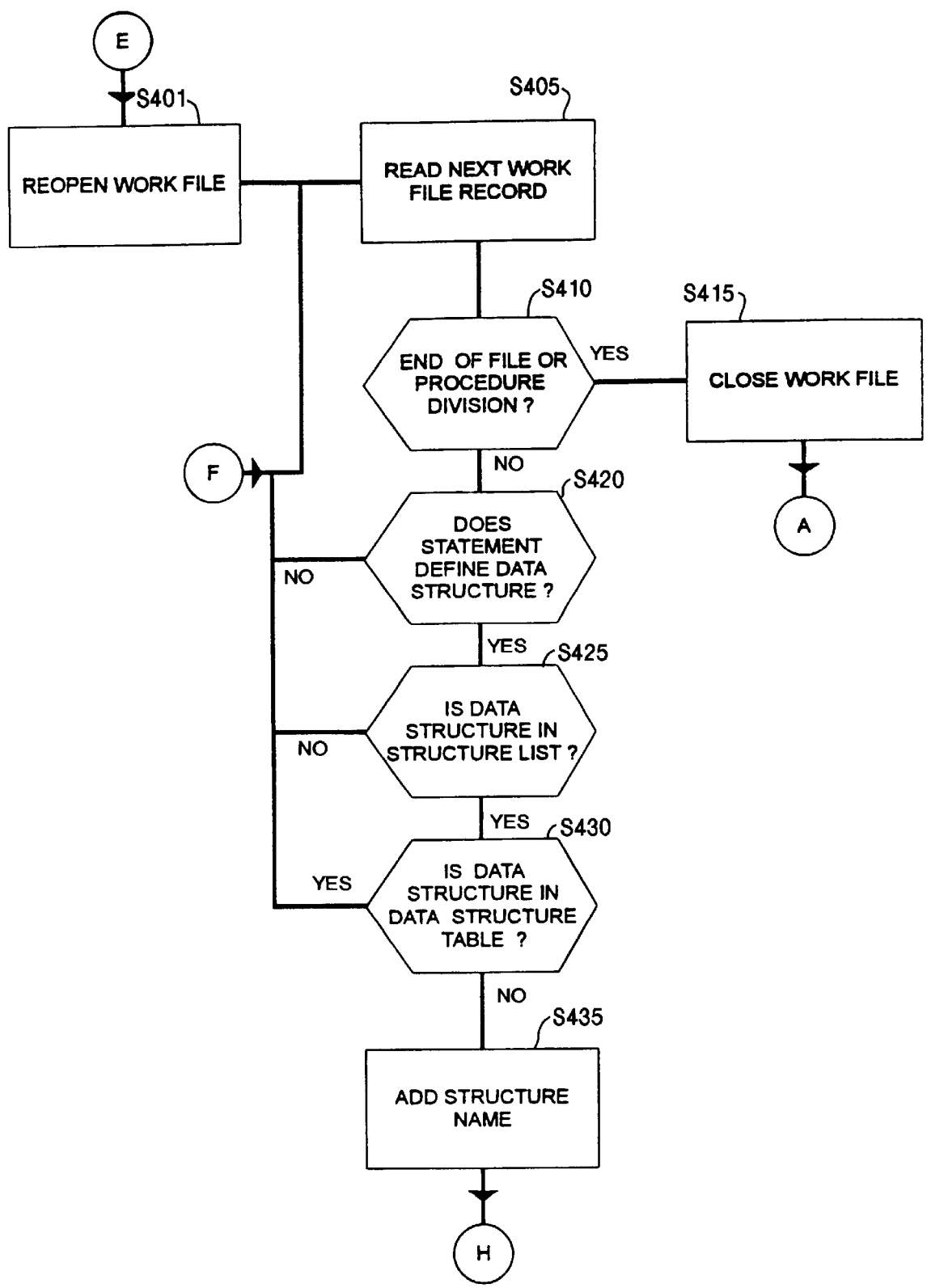

Upon detection of an end of file record in the step S310 of FIG. 6, the operations of the flow chart of FIG. 7 are performed to find all of the candidate data structures of the opened member program and to place the data structures in a candidate data structure table. Referring to FIG. 7, the work file operated upon in FIG. 6 is reopened in step S401 and the next record of the work file is read in step S405. If it is decided in decision step S410 that the record is an end of file or start of a procedure division, no data structure definitions will be found in further work file records. Accordingly, the work file is closed and control is passed to step S105 in FIG. 4 from step S415 to read the next member record and access the next member file.

Until the end of file or procedure division is detected in the decision step S410, decision step S420 is entered to determine whether the record statement defines a data structure. If NO, step S405 is reentered to read the next data record. Otherwise, it is further determined in decision step S425 if the data structure is already in the candidate data structure list. When the data structure is in the candidate structure list, it is decided in step S430 whether the data structure is already stored in the structure table. In response to NO in step S425 or YES in the step S430, the step 405 is reentered for the next work file record. When the data structure is in the candidate structure list but is not found in the data structure table, the data structure name is added to the table in step S435 and control is passed to step S501 of FIG. 8.

Figure 8:
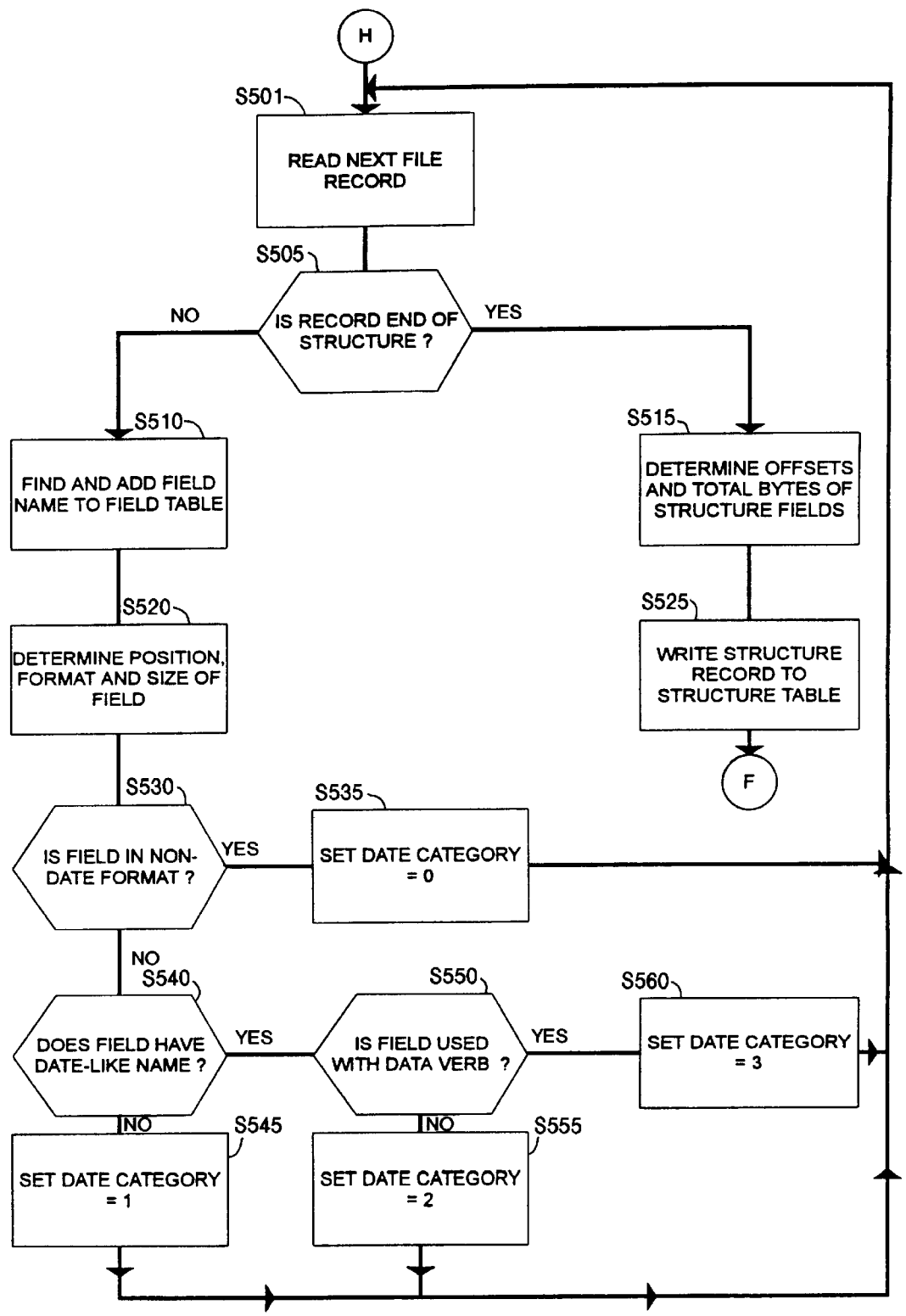

In the flow chart of FIG. 8, each data structure added to the data structure table is inspected to determine the fields of the data structure and their construction and to set a category from 0 to 3 indicating the probability that the field is a date field. Referring to FIG. 8, the next file record of the data structure from step S435 of FIG. 7 is read and it is decided in decision step S505 whether the record is an end of structure. If not, the name of a field of the data structure record is found (step S510) and the field position, format and size are determined (step S520). The field is then categorized as to whether it is a date field in decision steps S530, S540 and S550. If the field is in a non-date format in decision step 530, the date category is set to 0 so that the field is classified as a non-date field. When the field is in a date format in step 530 but does not have a date-like name in decision step S540, the date category is set to 1 (step S545). Where the field has a date-like name in step S540 but a date is not used with a data verb as determined in decision step S550, the date category is set to 2 in step S555. If a date is used with a data verb in the program as per step S550, the date category is set to 3 in step S560 as most likely to be a date field.

After the field in the present file record for the data structure has been classified, the step S501 is reentered to read the next file record. In this way, the construction of the fields of the candidate data structures in the structure table are determined and the field information and category are entered into the structure table. When an end of structure record is detected in the decision step S505, the offsets and total number of bytes of the field structures are determined (step S515) and the structure record is written to the structure table (S525). The step S405 of FIG. 7 is then reentered to read the next work file record for insertion of candidate data structures in the structure table. When an end of file or procedure division is detected in decision step S410, the work file is closed (step S415) and control is passed to step S105 of FIG. 4 in which the next member record is read to process the corresponding member program. The categories automatically determined in the source analysis of the flow charts of FIGS. 4 through 8 may also be modified by manual inspection of the program and the structure table.

The structure table generated in the source analysis of FIGS. 4–8 lists the set of data structures of the source code determined to be related to the processing of dates with ambiguous year elements. For each structure, there is stored:

1. An identification number entry (e.g., 00001);
2. Name (e.g., CUSTOMER-MASTER-RECORD);
3. Number of bytes (e.g., 50);
3. Number of fields (e.g., 5);
4. Location of structure definition (e.g., library name, definition line no., level no.); and
5. Category of structure (e.g., 0, 1, 2, 3).

For each field of the structure, there is a field table which includes entries for:

1. Structure number;
2. Field number;
3. Field name;
4. Location in structure (offset);
5. Number of bytes
6. Internal data type (e.g., zoned decimal);
7. Estimated date format (e.g., YYMMDD);
8. 9's complement flag (e.g., 0 for off);
9. Level number;
10. Date Category; and
11. Number of occurrences.

The flow charts of FIG. 9–13 illustrate the operation of the source converter module 305 of FIG. 3 for COBOL. The source converter module 305 includes permanently stored instructions that operate in accordance with the flow charts of FIGS. 9–13 to automatically convert the source code of the preexisting system application stored in control program store 120 into revised source code wherein calls to a conversion sub-routine are inserted in all processing steps identified by category in the source analyzer module 301 as processing ambiguous two digit year elements. The called sub-routine effects conversion of all ambiguous two digit year elements inputted to each processing step to corresponding unambiguous two digit year elements prior to performing the processing step and conversion of all unambiguous two digit year elements outputted from the processing step to corresponding ambiguous two digit year elements.

Figure 9:
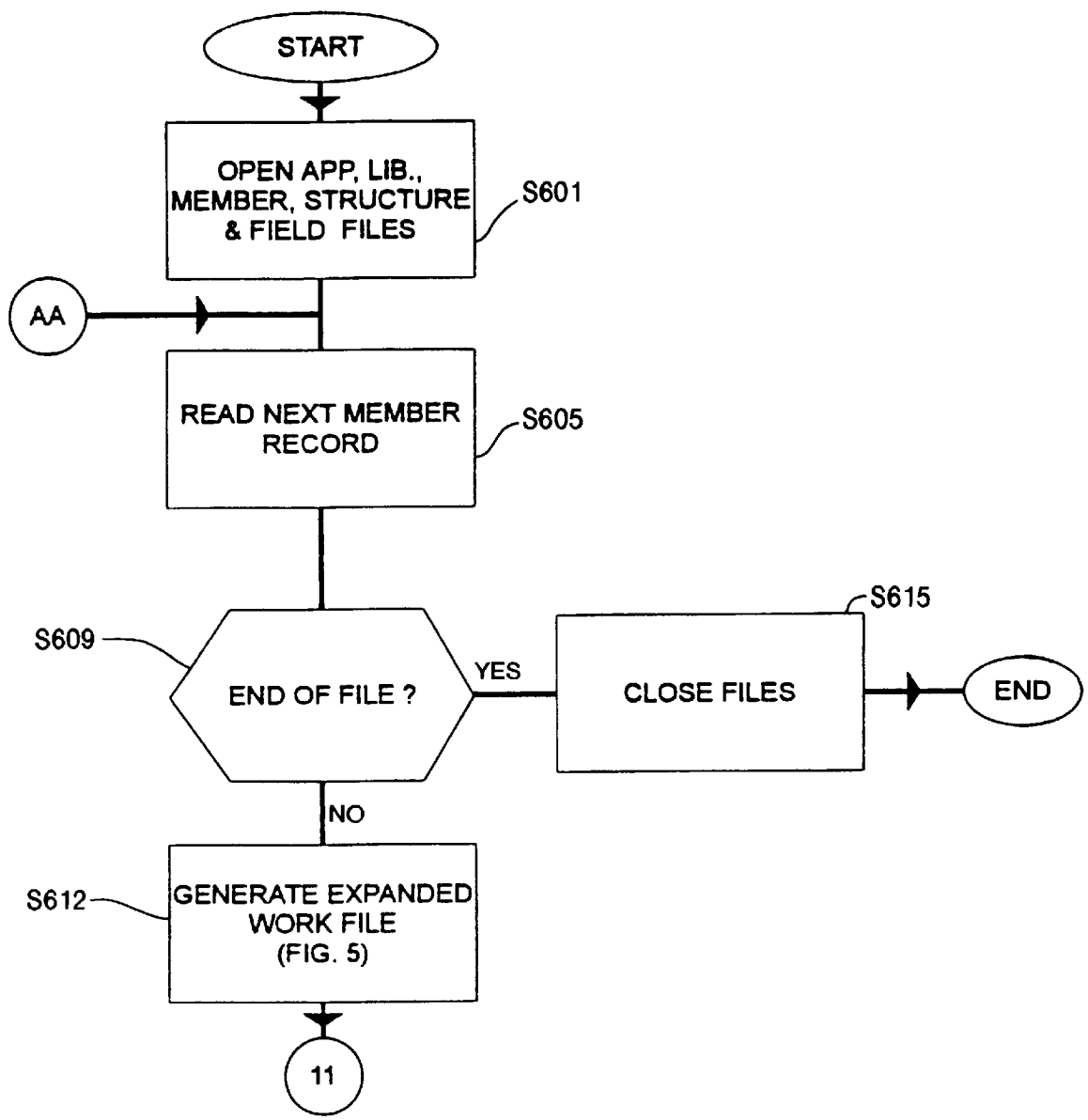
FIGS. 9–13 are flow charts illustrating the detailed operation of the source code conversion module of FIG. 3.
Figure 10:
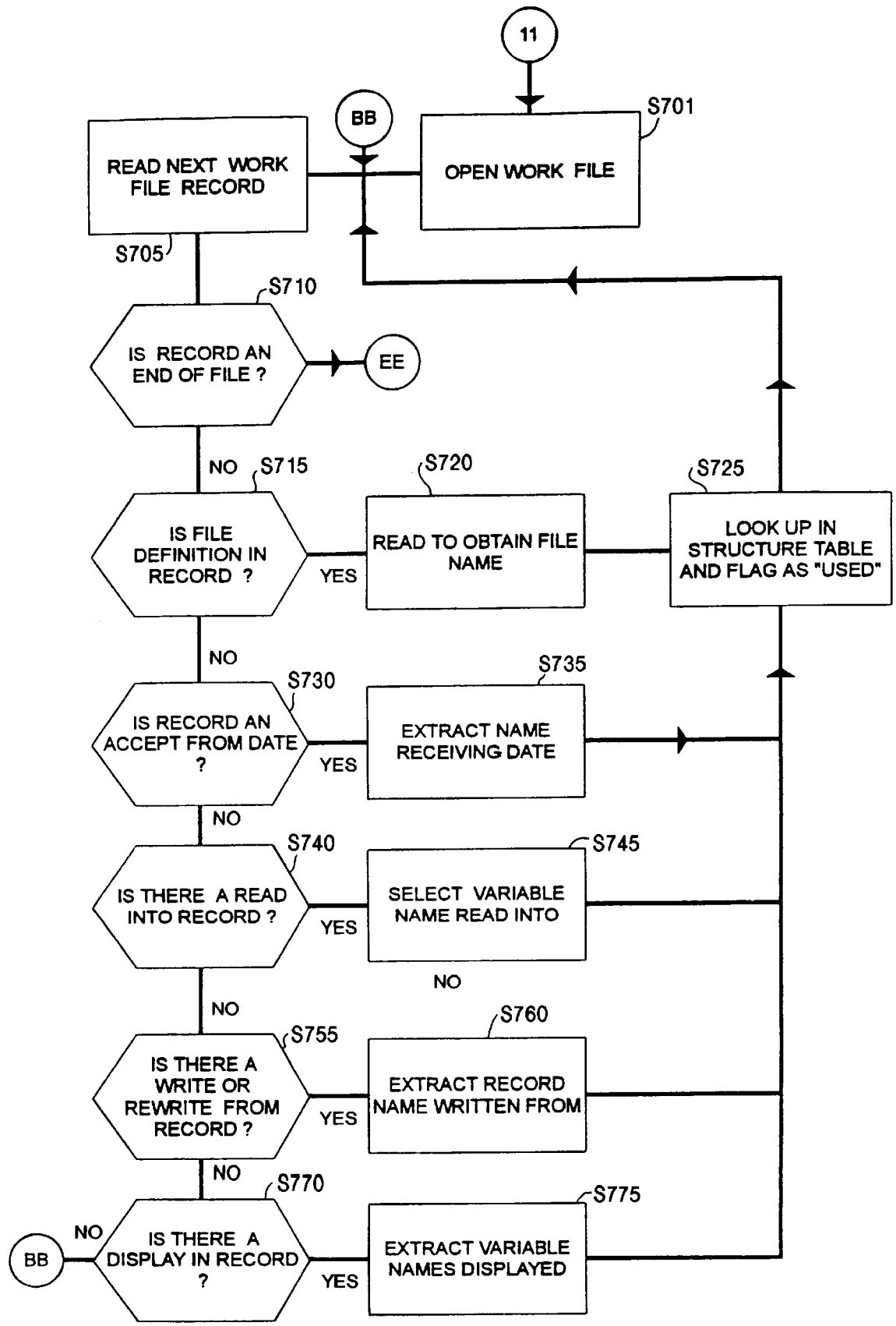

Referring to FIG. 9, the application, library, member, structure and field files of the system to be converted are opened in step S601 and the records of the member files are read sequentially (step S605) until and end of file is detected in decision step S609. An expanded work file is generated for the present member record in step S612 as shown in FIG. 5. As described with respect to FIG. 5, the expanded work file integrates the source code of the member program with code of programs referred to by the member program so that it includes all statements from other programs referenced by the member program. After the work file is generated, the operations of the flow chart of FIG. 10 are performed in which the expanded work file is scanned to detect records which contain file definitions, date acceptances, READ and WRITE statements and DISPLAYS. The names and variables of the detected records are extracted and are flagged as used in the structure table generated by source analysis module 301.

Step S701 of FIG. 10 is entered from the step S612 of FIG. 9 in which the generated work file is opened and the next work file record is read in step S605. Until an end of file is detected in step 710, the record is scanned in decision steps S715, S730, S740, S755 and S770. If the record contains a file definition in the step S715, the file name is extracted (step S720) and the entry for the file name is flagged (step S725) as used in the structure table generated by the source analyzer module 301. The step S705 is then reentered to read the next work file record. If an ACCEPT FROM DATE statement is detected in the step S730, the name that receives the date is extracted (step S735) and the name in the structure table is flagged as used (step S725). When a READ INTO is detected in the decision step S730, the variable name READ INTO is extracted (step S745) and is flagged in the structure table (step S725). The name written or rewritten detected in decision step S755 is extracted in step S760 and flagged in the structure table (step S725). When DISPLAY statements in the record are detected in the decision step S770, the variable names for the displays are extracted in step S775 and flagged as used in the structure table (step S725). Where a NO decision is made in the decision steps S715, S730, S740, S755 and S770, step S705 is reentered to read the next work file record. Upon detection of an end of file in the step S710, the flagging operations of the flow chart of FIG. 10 are completed and the insertion of year element change call sub-routine shown in FIGS. 11, 12 and 13 is started.

Figure 11:
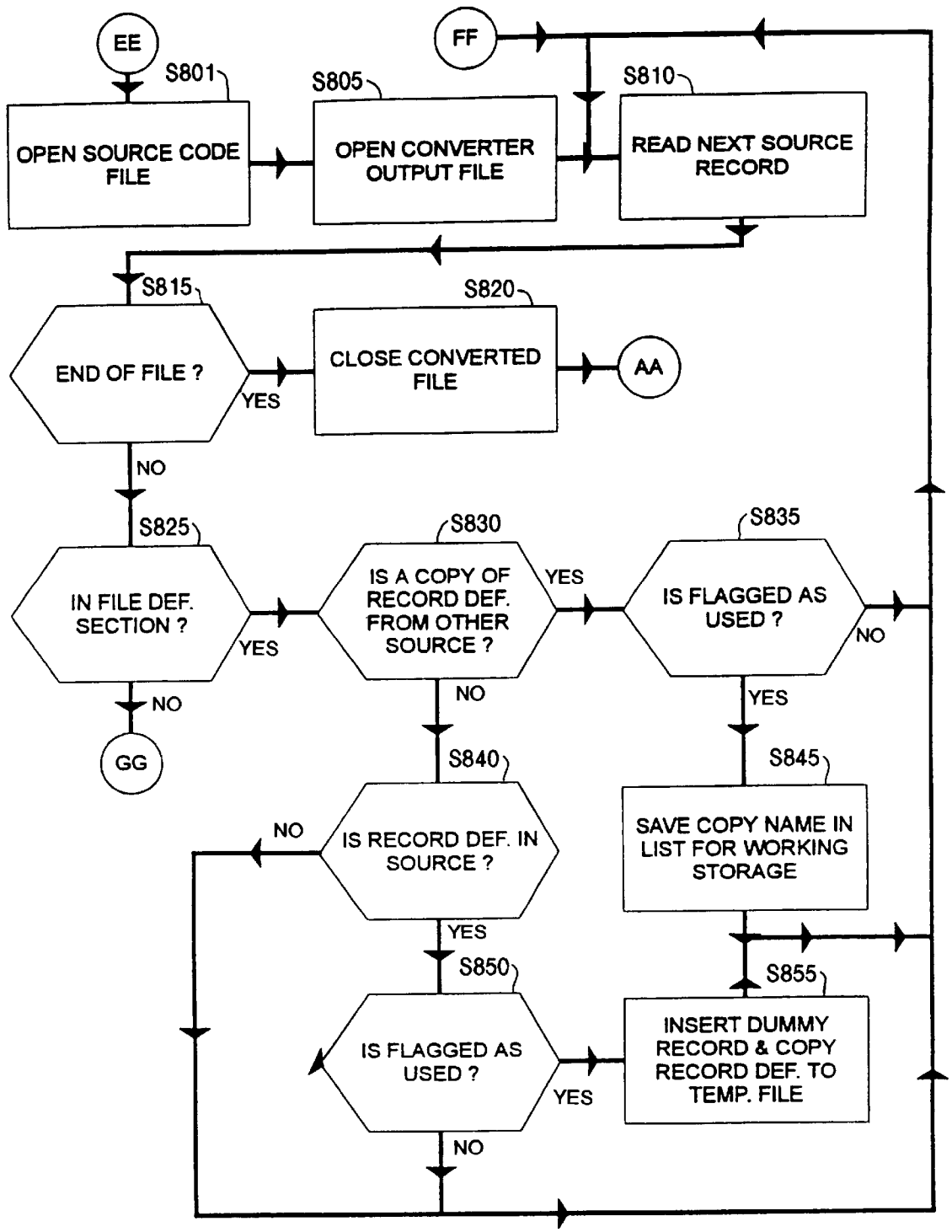

Referring to FIG. 11, step S801 is entered from the step S710 of FIG. 10; the source code file in control program store 120 and a converter output file are opened in steps S801 and S805 and the next source record is read in step S810. Unless the end of file is detected in decision step S815, it is decided in decision step S825 whether the source record is in the file definition section of the source code. If YES in the step S825, it is determined in decision step S830 whether the record is a copy of a record definition from a source other than the member source code. When the record definition is such a copy and it is determined in step S835 that the copy has been flagged in the structure table, the copy name is saved in a list to be placed in working storage (step S845). The step S810 is entered from either the NO of decision step S835 or the step S845 and the next source record is then read. If a NO decision is made in the step S830 and it is decided in decision step S840 that the source record has a definition and that the source record has been flagged as used in decision step S850, a dummy record and a copy of the record definition is written to a temporary file (step S855) and the step S810 is reentered. When a NO decision is made in the step S840 or the step S850, the step S810 is reentered to read the next source file record.

Figure 12:
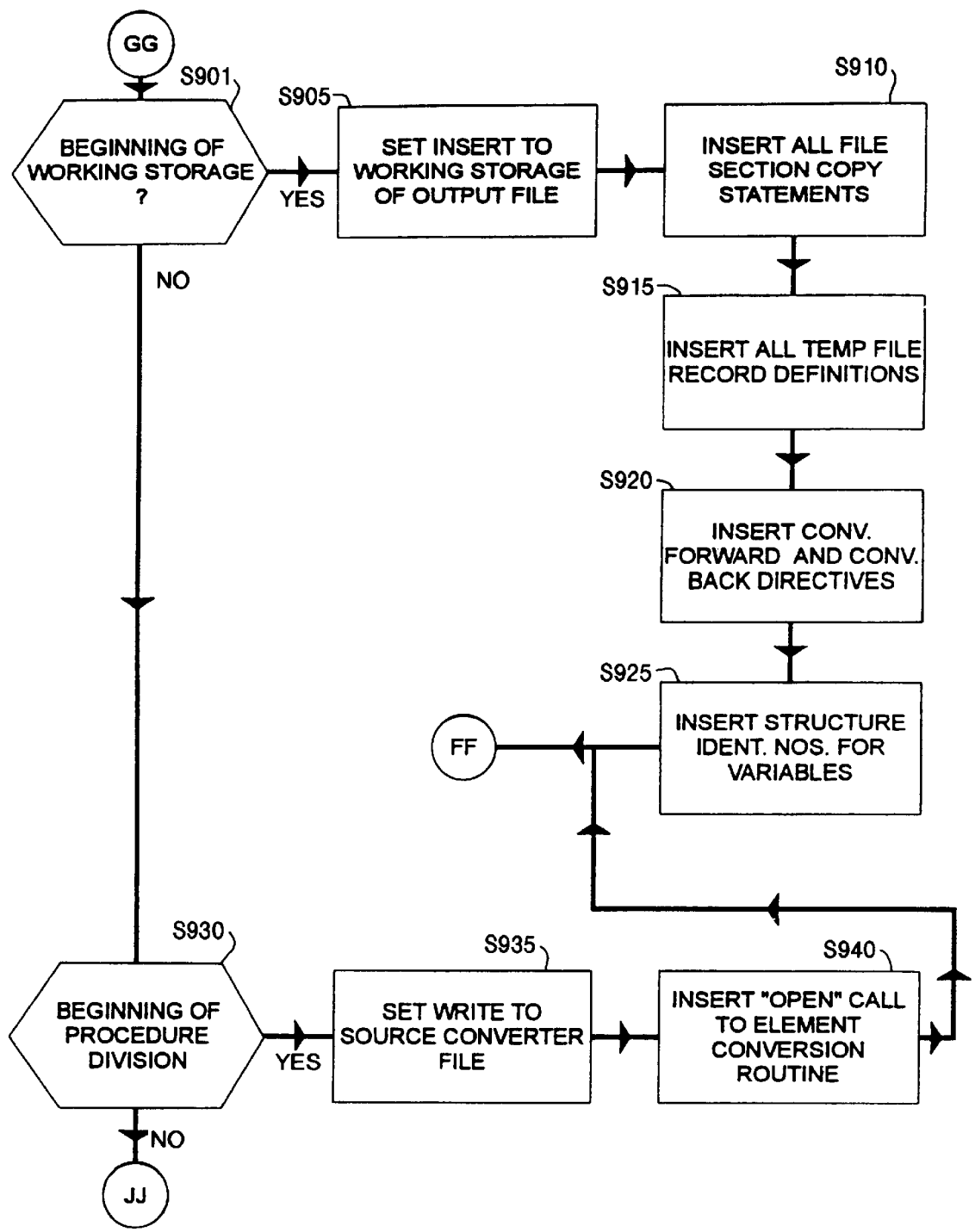

When the record is not in the file definition section, step S901 of FIG. 12 is entered from the decision step S825. Upon a decision in the step S901 that the record is at the beginning of working storage, a one-time process is initiated whereby insertions are made to working storage (step S905). The file section copy statements are inserted into the working storage (step S910) and the temporary file record definitions are inserted into working storage (step S915). The conversion forward directives for conversion from ambiguous year elements to unambiguous year elements and conversion back directives for conversion from unambiguous year elements to ambiguous year elements are inserted in working storage (step S920) and structure identification numbers for the variables are inserted into the working storage (step S925). Control is returned from the step S925 to the step S810 of FIG. 8 to read the next source file record. Where it is decided that the present record is not at the beginning of working storage in the decision step S901, decision step S930 is entered. If the beginning of the procedure division of the source code is detected in the decision step S930, a write to the converter output file is set (step 935) and a call to the element conversion sub-routine is inserted at the beginning of the procedure division (step S940) to put the data structures requiring conversion into memory. The step S810 of FIG. 8 is then reentered from the step 940 to access the next source file record. In the event that the present record is not at the beginning of the procedure division in the decision step 930, step 1001 of FIG. 13 is entered.

Figure 13:
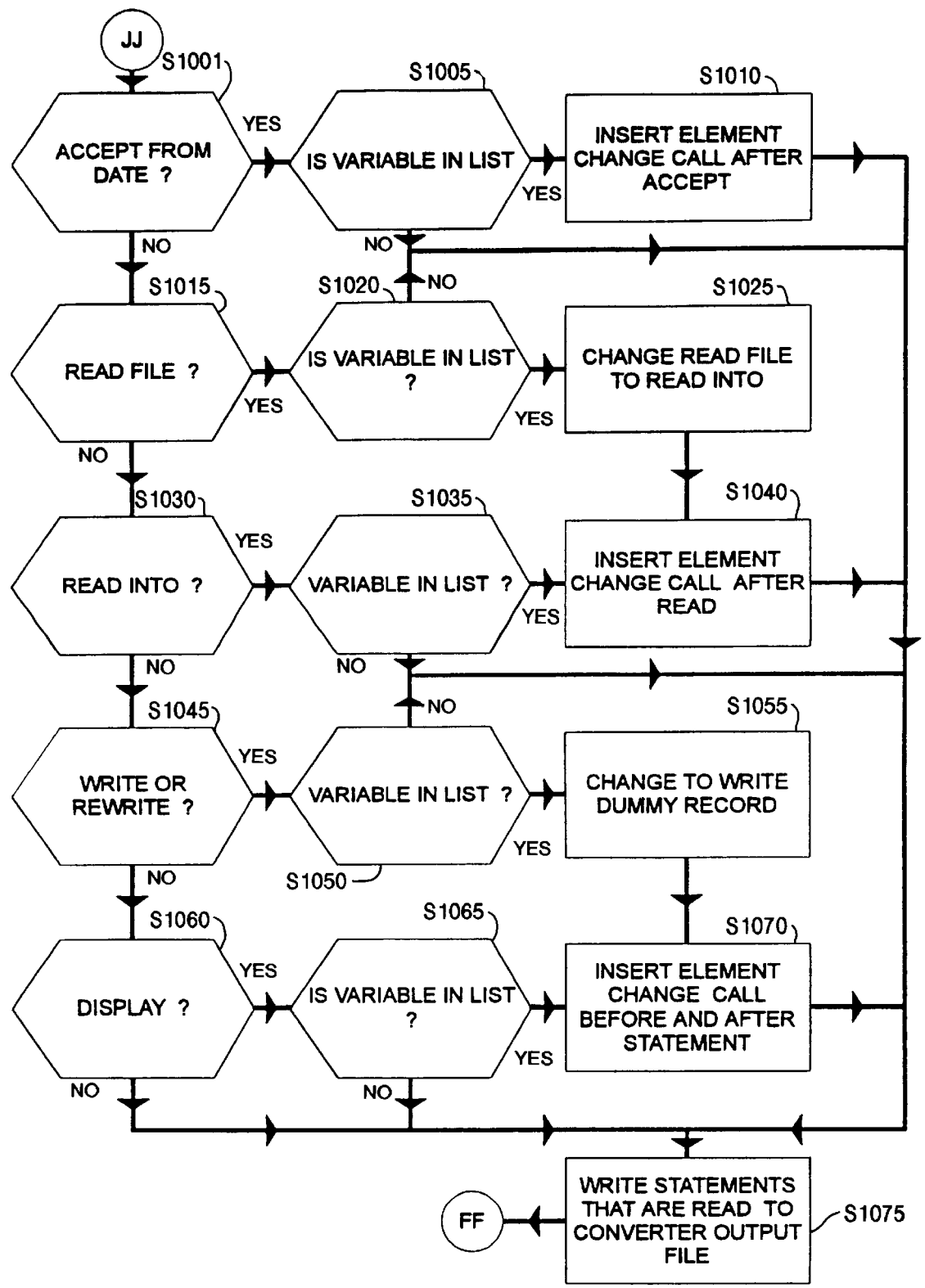

In the flow chart of FIG. 13, the present record is scanned in decision steps S1001, S1015, S1030, S1045 and S1080 to determine if the processing of the record requires insertion of the call to the year element conversion sub-routine. If an ACCEPT FROM DATE is detected in the present record in the decision step S1001 and it is determined that the variable of the ACCEPT FROM DATE is in the structure table in decision step S1005, the call to the year element change sub-routine is inserted after the ACCEPT FROM DATE statement (step S1010). The call is not inserted for variables not in the structure table in the decision step S1005. Control is returned to the step S810 of FIG. 8 from the step S1010 or from the NO decision in the step S1005 after the statements that are read are written to the converter output file in step 1075.

When the record contains a READ FILE statement in the decision step S1015 and the variable for the READ FILE statement is in the structure table in step S1020, the READ FILE statement is changed to a READ FILE INTO statement (step S1025) and the call to the year element change sub-routine is inserted after the READ statement (step S1040). If a READ INTO statement (decision step S1030) is detected in the decision step S1030 after a NO decision in the step 1015 and the variable for the READ INTO statement is in the structure table (step S1035), the call to the year element change sub-routine is inserted after the READ INTO in the step S1040. Control is returned to the step S810 of FIG. 8 from the step S1040 or from the NO decision in the step S1035 after the statements that are read are written to the converter output file in the step 1075.

The Decision step S1045 is entered from the NO result in decision step S1030 and it is decided if the record has a WRITE OR REWRITE statement. If YES in decision step S1045 and the variable for the WRITE OR REWRITE is in the structure table (decision step S1050), the statement is changed to a write dummy statement in step S1055 and a call to the year element change sub-routine is inserted before the dummy statement (to convert to ambiguous format) and after the write dummy record statement (to convert to unambiguous format for further processing) in step S1070. Upon a NO decision in the step S1045, it is determined in the step S1060 whether the record has a DISPLAY statement. If YES in the decision step S1060 and the DISPLAY variable is in the structure table, the call to the year element change sub-routine is inserted before and after the DISPLAY statement in the step S1070. Control is passed to the step S810 of FIG. 8 from the NO decision in the step S1050, the step S1065 or the step S1070 after the statements that are read are written to the converter output file in the step S1075.

When an end of file is detected in the next record that is read in the decision step S815, the convertor output file is closed in step 820 of FIG. 11 and control is returned to the step S605 of FIG. 9 so that the next member record is read. Upon detection of the end of the member file in decision step S609, all files are closed. At this time, the operations of the source conversion module have been completed and the original source code augmented by calls to the year element change sub-routine has been generated to replace the original source code in the control program store 120 of FIG. 1.

The year element change sub-routine operates to change the ambiguous YY year element based on the 00 year to and from an unambiguous YY year element based on a year preceding the earliest year to be encountered in data sources for "legacy" applications. Ambiguous year elements are of the form YY with a base year of 00. For change to an unambiguous year element, a base year BB is selected that precedes the earliest ambiguous $YY_a$ element to be encountered in the application. Preferably, the base year BB is a leap year and, when calculations are made based on the day of the week in the source code, the base year BB is preferably divisible by 28. By way of example, a base year BB=56 may be selected for data sources in which years $YY_a \geq 56$ so that corresponding unambiguous years up to 2055 may processed. In converting forward to unambiguous year elements $YY_u$, the corresponding unambiguous year is generated according to $$YY_u = YY_a - BB \text{ for } YY_a \geq BB \quad (1)$$

and $$YY_u = 100 + YY_a - BB \text{ for } YY_a < BB \quad (2).$$

Accordingly, the ambiguous years from (19)56 to (19)99 are represented to the unambiguous year elements $YY_u$=00 to 43 and the ambiguous years from (20)00 to (20)55 are represented by the unambiguous year elements $YY_u$=44 to 99. In converting back to ambiguous years, $$YY_a = YY_u + BB \text{ truncated to two digits} \quad (3)$$

so that the ambiguous year (20)00 is obtained from the unambiguous year 44. According to one aspect of the invention, the source code analysis may automatically identify each processing step of any "legacy" application using the ambiguous two digit year representation. According to a second aspect of the invention, the conversion is performed by automatically inserting calls to the year element conversion routine. According to a third aspect of the invention, the conversion is performed using the same format for unambiguous year elements as found in the ambiguous year elements so that the processing steps may be performed without any alteration of the embedded source code.

When called, the sub-routine operates in three different modes. In a first "open" mode, the structure table is addressed to read the structure records therein and to add the structure records to memory. In a second "close" mode, the memory containing the structure records are made available for other use. In a third "change YY element" mode, the date fields of the data structures in the processing step issuing the call are sequentially accessed. When an ambiguous year element is to be changed to a corresponding unambiguous year element, conversions are made according to equations 1 and 2 taking into account the code representations of the YY, element. If an unambiguous year element is to be changed to an ambiguous year element, the conversion is performed according to equation 3 taking into account the code representations of the $YY_u$ element.

Figure 14:
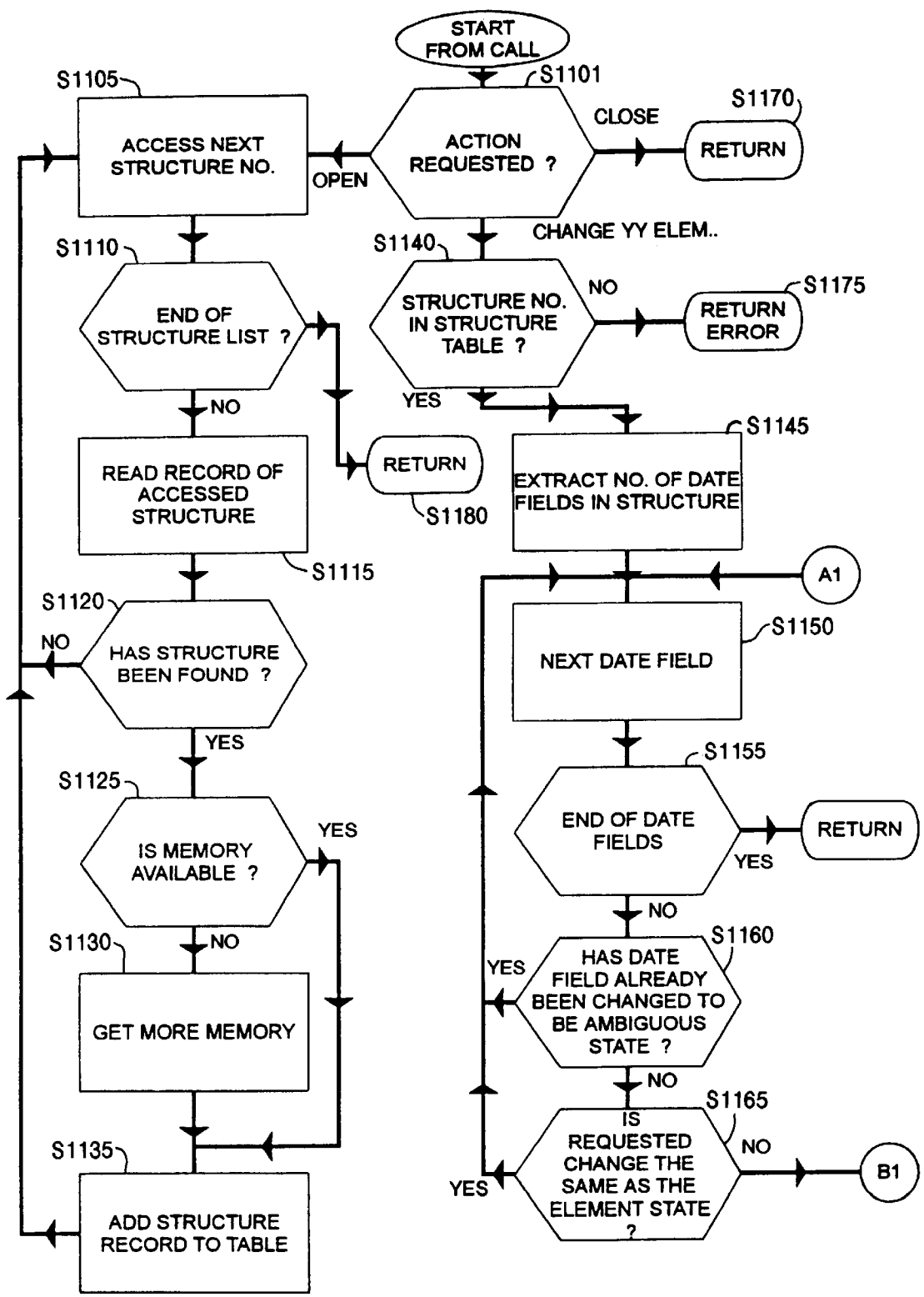
FIGS. 14 and 15 are flow charts illustrating the detailed operation of the data element conversion module of FIG. 3.

FIGS. 13 and 14 are flow charts that illustrate the year element conversion sub-routine. Upon a call to the sub-routine, decision step S1101 of FIG. 13 is entered in which the mode of action is decided. If the argument passed from the issuing processing step is OPEN, the data structures are sequentially accessed by number in step S1105 of FIG. 13. Until the end of the structures is detected in decision step S1110, the record of the next accessed structure is read in step S1115. When it is determined in decision step S1120 that the accessed structure is not found in the structure table, control is returned to the step S1105 to access the next structure number. If the structure is found in the structure table, memory is made available in steps S1125 and S1130; the structure record is added to the structure table and control is passed to the step S1105 to access the next structure number. When the end of structure list is detected in the step S1110, control is returned to the calling processing step (step 1180). Where the requested action in the decision step S1101 is CLOSE, the memory containing the structure records are made available and control is returned to the calling processing step (step S1170).

In the event that the requested action in decision step S1101 is "change YY elements", it is checked in decision step S1140 whether the structure number in the calling processing step is in the structure table. If not, an error is returned (step S1175). Otherwise, the number of date fields in the structure is determined (step S1145) and the loop including step S1150 and decision steps S1155, S1160 and S1165 is entered. The next date field is accessed in the step S1150. Until the end of date fields is detected in the decision step S1155, it is determined whether the date field has already been changed to an ambiguous state in decision step S1160. If YES in decision step S1160, the year element already exists in ambiguous state in the field storage for processing and control is returned to the step S1150 to access the next date field. If NO in step 1160 and it is decided in decision step S1165 that the requested change is the same as the year element state, control is returned to the step S1150. If the requested change is not the same as the element state and the date field has not been changed to the unambiguous year element, step S1201 of FIG. 15 is entered to perform year element conversion.

Figure 15:
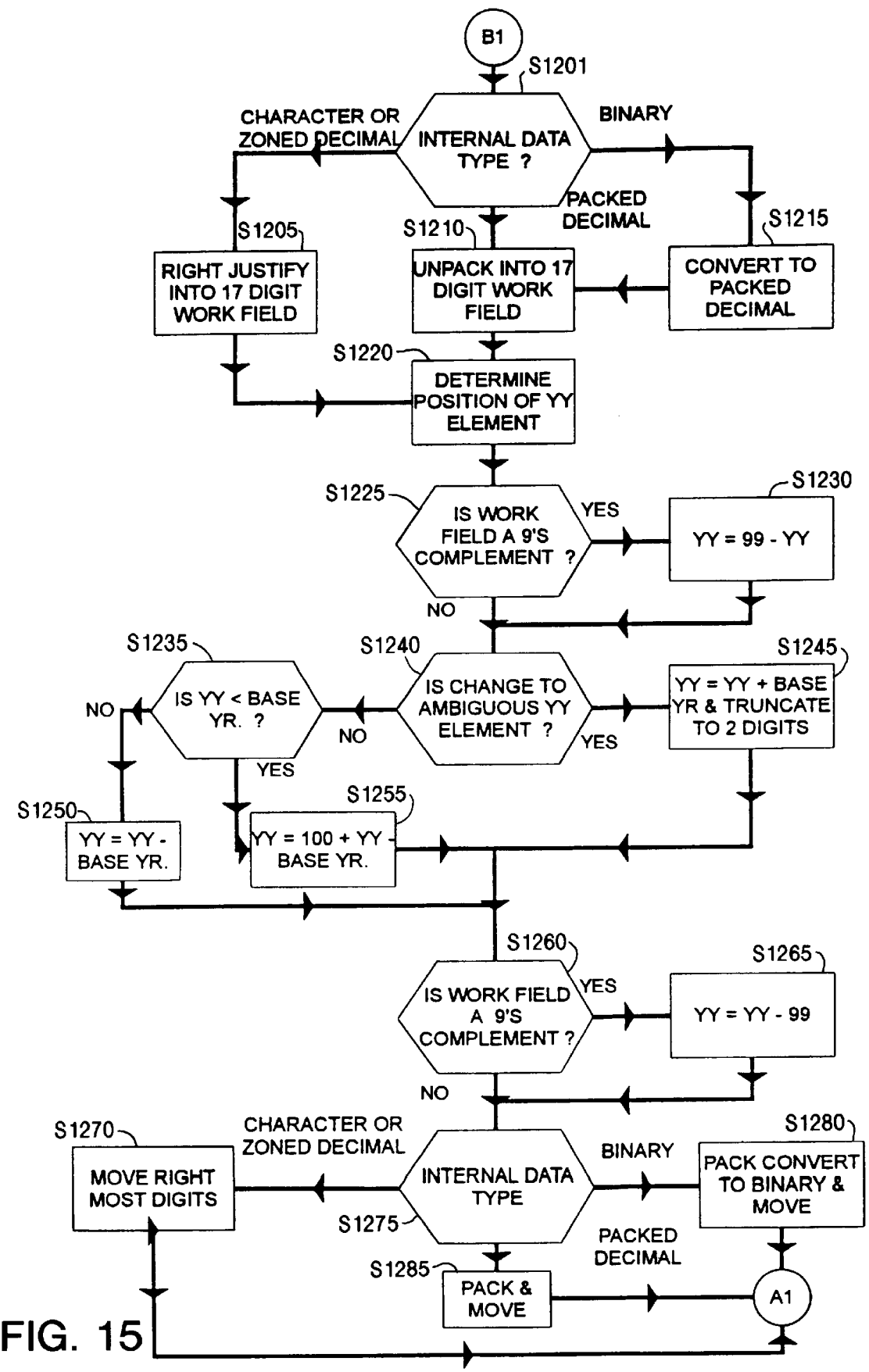

Referring to FIG. 15, the internal data type of the date field in which the year element is to be converted is determined in decision step S1201. If the internal date type is a character or zoned decimal, the date field is right justified into a 17 digit work field in step S1205 and the position of the YY year element in the work field is determined in step S1220. When the internal data type is detected as binary in decision step S1201, the date field is converted to packed decimal in step S1215, unpacked into a 17 digit work field in the step S1210 and the position of the YY year element is determined in the step S1220. If the internal data type of the date field is determined to be packed decimal in decision step S1201, it is unpacked into the 17 digit work field in step S1210 and the position of the YY year element is determined in the step S1220.

Prior to conversion of the year element, the 17 digit work field is scanned in decision step S1225 to decide if it is a 9's complement. If YES in the step S1225, the year element is changed to 99–YY in step 1230. The direction of conversion has been set in the insertion of the call in the processing step during the source conversion controlled by the source conversion module 305 in FIG. 3. calling the conversion sub-routine. The direction parameter in the call may be set as forward from an ambiguous year element to an unambiguous year element or back from an unambiguous year element to an ambiguous year element. Whether the change is back from an unambiguous year to an ambiguous YY year element is detected from the call parameters in decision step S1240. If the change is back to the ambiguous year element representation, the conversion of equation 3 is performed in step S1245. When the requested change is forward to the unambiguous year element, decision step S1235 is entered. Where the year element YY is less than the base year, the conversion of equation 2 is performed in the step S1255. Otherwise, the conversion of equation 1 is performed in step S1250.

After the conversion in one of steps S1245, S1250 and S1255 is completed, the converted work field is changed into a date field of the appropriate internal data type. First, decision step S1260 is entered in which whether the converted work field is a 9's complement is determined. If YES, the 9's complement conversion of step S1265 is performed. The internal data type of the converted date field is then identified in decision step S1275 and the converted work field is modified in step S1270, S1280 or S1285 according to whether the date field is to be a character or zoned decimal, a binary number or a packed decimal. Control is then returned to step S1150 in FIG. 14 to process the next date field of the present data structure. After the last date field of the present data structure is processed in FIGS. 14 and 15, the end of date fields is detected in the decision step S1155 and control is returned to the processing step that issued the call.

It is to be understood that the specific embodiment described herein is merely illustrative of the spirit and scope of the invention. Modifications can readily be made by those skilled in the art in accordance with the principles of the invention.

What is claimed is:

1. A method of data processing in a system having data structures that include ambiguous elements of a predetermined format, comprising the steps of:

analyzing source code of the system to identify processing steps of the data processing that process the data structures including ambiguous elements of the predetermined format;

generating an instruction code module including a first set of instructions which converts each ambiguous element to be inputted to an identified processing step of the data processing to a corresponding unambiguous element having the same predetermined format and a second set of instructions which converts an unambiguous element produced by an identified processing step of the data processing to a corresponding ambiguous element;

inserting a call to the instruction code module in an inputting portion of each identified processing step of the data processing to obtain the corresponding unambiguous element for each ambiguous element for processing in the identified processing step of the data processing; and inserting a call to the instruction code module in an outputting portion of each identified processing step of the data processing to obtain the corresponding ambiguous element for each unambiguous element produced by the identified processing step of the data processing for outputting in the identified processing step of the data processing.

2. The method of claim 1 further comprising the step of executing the modified source code including:

calling the instruction code module prior to inputting an ambiguous element in a detected processing step of the data processing responsive to the occurrence of the call in the modified source code to substitute an unambiguous element having the predetermined format for the ambiguous element in each detected data structure; and calling the instruction code module prior to outputting an ambiguous element in a detected processing step of the data processing responsive to the occurrence of the call in the modified source code to convert the unambiguous element to a corresponding ambiguous element of the predetermined format.

3. Apparatus for data processing in a data processing system using a data structure that includes an ambiguous element of a predetermined format, comprising:

means for analyzing source code of the system to identify the data structures that include the ambiguous elements;

means for generating a conversion instruction code module including a set of instructions which converts each ambiguous element to be inputted to a processing step of the data processing system to a corresponding unambiguous element having the same predetermined format and returns the corresponding unambiguous element to the processing step of the data processing system for inputting and a set of instructions which converts an unambiguous element produced by a processing step of the data processing system to a corresponding ambiguous element and returns the corresponding ambiguous element to the processing step of the data processing system for outputting;

means responsive to the source code and the identified data structures for detecting the processing steps of the source code which process ambiguous elements of the identified data structures; and means responsive to the detected processing steps for modifying the source code of the data processing system to include a call to the instruction code module in each detected processing step of the data processing system.

4. The apparatus of claim 3 further comprising the means for executing the modified source code including:

means responsive to the call instruction for calling the instruction code module prior to inputting an ambiguous element in a detected processing step of the data processing responsive to the occurrence of the call in the modified source code to substitute an unambiguous element having the predetermined format for the ambiguous element in each detected data structure; and means responsive to the call instruction for calling the instruction code module prior to outputting an ambiguous element in a detected processing step of the data processing responsive to the occurrence of the call in the modified source code to convert the unambiguous element to a corresponding ambiguous element of the predetermined format.

* * * * *